United States Patent [19]

Hovarongkura et al.

[11] 4,252,631
[45] Feb. 24, 1981

[54] ELECTROSTATIC COALESCENCE SYSTEM WITH INDEPENDENT AC AND DC HYDROPHILIC ELECTRODES

[75] Inventors: A. David Hovarongkura, Arlington, Va.; Joseph D. Henry, Jr., Morgantown, W. Va.

[73] Assignee: The United States of America as represented by the United States Department of Energy, Washington, D.C.

[21] Appl. No.: 110,738

[22] Filed: Jan. 9, 1980

[51] Int. Cl.³ .......................... B03C 5/00; B03C 5/02
[52] U.S. Cl. .................................. 204/302; 204/186; 204/188
[58] Field of Search ................. 204/180 R, 184, 186, 204/188, 299 R, 302, 304, 305, 306, DIG. 8

[56] References Cited

U.S. PATENT DOCUMENTS

| | | | |
|---|---|---|---|
| 1,916,235 | 7/1933 | Ruben | 204/DIG. 8 |
| 3,574,085 | 4/1971 | Woelflin | 204/302 |
| 3,577,336 | 5/1971 | Shirley | 204/302 |
| 3,701,723 | 10/1972 | Cole et al. | 204/188 |
| 3,717,568 | 2/1973 | Brown et al. | 204/DIG.8 X |
| 3,813,328 | 5/1974 | Turner | 204/302 |
| 3,891,537 | 6/1975 | Tokumoto | 204/302 X |
| 3,898,152 | 8/1975 | Hodgson | 204/302 X |

Primary Examiner—Arthur C. Prescott
Attorney, Agent, or Firm—James E. Denny; Stephen D. Hamel; David E. Breeden

[57] ABSTRACT

An improved electrostatic coalescence system is provided in which independent AC and DC hydrophilic electrodes are employed to provide more complete dehydration of an oil emulsion. The AC field is produced between an AC electrode array and the water-oil interface wherein the AC electrode array is positioned parallel to the interface which acts as a grounded electrode. The emulsion is introduced into the AC field in an evenly distributed manner at the interface. The AC field promotes drop-drop and drop-interface coalescence of the water phase in the entering emulsion. The continuous oil phase passes upward through the perforated AC electrode array and enters a strong DC field produced between closely spaced DC electrodes in which small dispersed droplets of water entrained in the continuous phase are removed primarily by collection at hydrophilic DC electrodes. Large droplets of water collected by the electrodes migrate downward through the AC electrode array to the interface. All phase separation mechanisms are utilized to accomplish more complete phase separation.

6 Claims, 4 Drawing Figures

EMULSION

ELECTROSTATIC COALESCENCE SYSTEM WITH INDEPENDENT AC AND DC HYDROPHILIC ELECTRODES

This invention is a result of a contract with the U.S. Department of Energy.

BACKGROUND OF THE INVENTION

This invention relates generally to systems for removing water from an oil emulsion by electrostatically promoting coalescence of water droplets into sizes large enough to gravitate from the oil. More specifically this invention relates to an improved electrostatic coalescence system for separating a dispersed water phase from a continuous oil phase in which independent AC and DC electric fields are employed together with hydrophilic electrodes to take advantage of a number of phase separation mechanisms to accomplish more complete phase separation.

In the petroleum industry electrostatic coalescence techniques have been employed for resolving water-in-oil emulsion. Generally, an AC electric field is used when the electrical conductivity of the continuous oil phase is between $10^{-8}$ to $10^{-10}$ ohm$^{-1}$ cm$^{-1}$, and a DC electric field is used when the electrical conductivity of oil is less than $10^{-10}$ ohm$^{-1}$ cm$^{-1}$. The conductivity is generally dependent on the amount of water in the crude oil.

Not only is water present naturally in crude oil, but water is added and vigorously mixed with crude stock to aid in the process of desalting of the crude prior to refining. Desalting is a process in which salts, water and solid particles are removed from the crude oil through the separation of the salt and solid-laden water phase from the continuous oil phase. The presence of salts, water and solids in crude causes various problems in the operation of an oil refinery. It causes the formation of sludge in crude storage tanks which reduces the storage capacity. Sludge may also accumulate in distillation columns and cause serious operation problems. Salt deposition in equipment such as heat exchanger tubes in crude furnaces leads to plugging and fouling of the process equipment. Salts also catalyze the formation of coke in the furnace. Coke deposition reduces the heat transfer coefficient, causing localized heating and eventually leading to blistering or rupture of the tubes.

Further, salts in crude oil cause corrosion because they lead to evolution of hydrochloric acid in distillation equipment. The severe corrosion from the combination of sulfur-containing compounds with hydrogen chloride, is caused by oxidation reduction reactions. The units most susceptible to corrosion from hydrogen chloride are those where moisture may be present, such as in condensers.

When the crude feed contains salts, the solubility and ductility of asphalt products can be affected. Salts also cause fuel oil to have excessively high ash content. Gas turbine fuel must be salt-free, otherwise fused salts can seriously damage the turbine blades.

Thus, it will be seen that salts in crude oil must be removed prior to charge into crude distillation units. Water and solid particles are also removed as the result of extraction of salts with water. It has been recognized in the art that the fastest method of water extraction from crude feed is through the use of electrostatic coalescence methods.

Generally, systems employing electrostatic coalescence methods have used either DC or AC electric fields only. One system is known in which a pulsed DC field is employed to simulate a combination AC and DC coalescing system. Details of this system may be had by referring to the following patents:

1. U.S. Pat. No. 3,772,180 issued to Floyd L. Prestridge for "Electric Treater," Nov. 13, 1973.
2. U.S. Pat. No. 3,847,775 issued to Floyd L. Prestridge for "Process for Electrical Coalescing of Water," Nov. 12, 1974.

Briefly, the referenced system employs a single set of electrodes mounted above the emulsion-water interface in the treater containment. The positive and negative electrodes are alternately pulsed to produce a generally uniform DC field between the electrodes and a simulated non-uniform AC field between the electrodes and the interface which acts as a ground electrode. The field gradients vary depending upon the dispersed phase volume fraction of the emulsion introduced at the interface. Thus, since the AC and DC fields are produced using common electrodes, the dispersed phase volume entering the DC field region controls both the AC and DC field components. Non-uniformity in the fields can cause very high localized electric field gradients which produce water droplet breakup, redispersing the water phase and reducing the efficiency of the unit. Further, the AC and DC fields cannot be independently controlled for selected AC and DC electric field gradients for most efficient operation. The DC electrode spacing is dictated by spacing requirements for producing the simulated AC field. For more complete phase separation it has been found that the spacing between the DC electrodes, through which the continuous oil phase passes after the bulk of the water is removed by the AC electrodes, should be small to provide short drop residence time required for the removal of small dispersed water drops from the continuous oil phase. This allows collection of small drops of water at hydrophilic electrodes which is the primary DC phase separation mechanism of the present invention. Drop-drop coalescence, settling of coalesced drops, and drop contact charging are secondary phase separating mechanisms provided by the independent DC electrode arrangement contemplated by the present invention.

Therefore, it is an object of the present invention to provide an improved electrostatic coalescence unit for removal of water dispersed in crude oil with independent AC and DC electrode structures which provides more complete separation.

Yet another object of this invention is to provide an electrostatic coalescence unit as set forth in the above object in which multiple-phase separation mechanisms are utilized to enhance more complete phase separations.

Other objects and many of the attendant advantages of the present invention will be obvious to those skilled in the art from the detailed description of the invention which follows hereinbelow.

SUMMARY OF THE INVENTION

Briefly, the invention contemplates the locating of both AC and DC electric field generating electrodes within the same water extraction vessel wherein a crude oil emulsion is introduced uniformly distributed in a first zone coextensive with an interface between the water phase and the continuous oil phase. A perforated planar AC electrode structure is located parallel to and above the interface in a second zone through which the continuous oil phase flows upward. An array of vertically orientated DC field generating electrodes are located above the AC electrode array in a third zone through which the continous oil phase passes after leaving the second zone. In the AC field region drop-interface coalescence (zone 1) and drop-drop coalescence (zone 2) are the primary mechanisms of phase separation. The maximum liquid-liquid interfacial area is provided and a large fraction of the water is extracted in the region. In the DC field region (zone 3) the electrodes are closely spaced to form a strong electric field gradient and the array of electrodes is alternately poled with the negative-poled electrodes being treated with a hydrophilic material to promote electrode drop collection efficiency. Further, coalescence is achieved through the mechanisms of dipole drop-drop coalescence, and drop charging. The coalesced droplets gravitate downward through the continuous phase flow to the interface and through drop-interface coalescence and enter the water phase at the bottom of the containment. The collected water is pumped from the tank to maintain a constant interface level.

DETAILED DESCRIPTION

Figure 1:
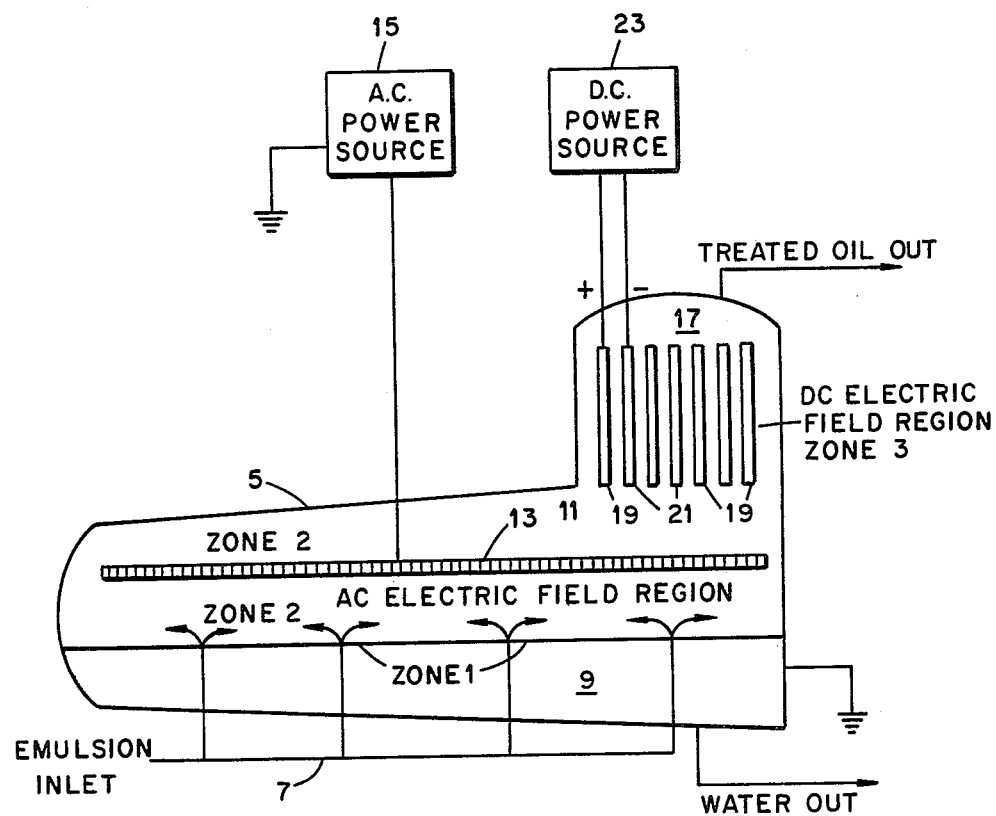
FIG. 1 is a diagrammatic view of the flow pattern of crude oil through the shell of a dehydrating vessel and the electrical system in which the invention is embodied.

Referring now to FIG. 1, there is shown schematically a containment vessel 5 which is in the general form of a horizontally extending cylinder. An emulsion is introduced into the vessel 5 as a continuous distributed flow through a flow distribution system 7. The inlet distribution is designed to be located in the dispersion band as near as possible to the interface between the water filling the lower portion 9 of the vessel and the continuous oil phase filling the upper remainder portion 11 of the vessel. The emulsion is distributed so that a uniform emulsion layer covers the interface, identified as zone 1 of the dehydrator for reference hereinbelow.

Figure 2:
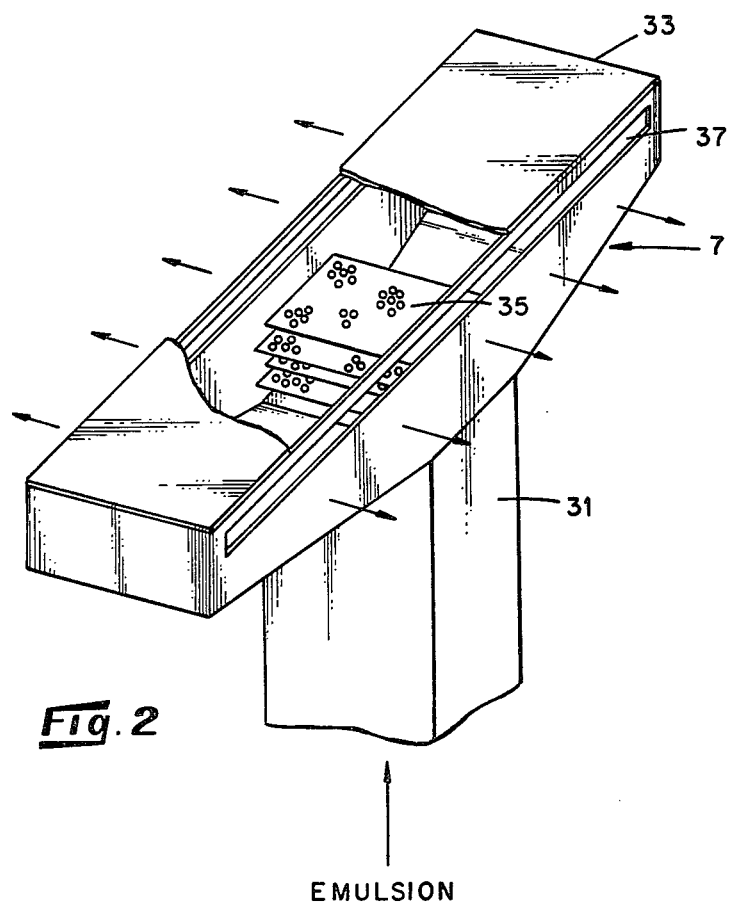
FIG. 2 is a partially sectional perspective view of an inlet emulsion distribution for distributing the inlet emulsion flow as shown schematically in FIG. 1.

The emulsion flow distributor system 7 may take various forms. One form of a flow distributor, shown in FIG. 2, is a variable area distributor. The emulsion enters at the middle of the distributor through an inlet manifold 31 and then is distributed laterally along the length of a variable area distributor chamber 33. The entering emulsion is damped by a flow damper system 33 located just above the inlet manifold 31. The damper is formed by a spaced-apart stack of perforated plates. The flow damper reduces the emulsion velocity and thus improves the emulsion distribution through the variable area chamber 33. The inlet emulsion is distributed evenly through openings, or slots 37, along the upper length of the distributor chamber 33. A desired number of the distributors 7 may be arranged either along the length or the width of the vessel to provide the desired distribution of the emulsion over the interface.

An AC electrode structure 13 composed of a perforated plate conductor is located just above and parallel to the liquid-liquid interface. The electrode structure 13 extends over the entire distributed emulsion layer forming an AC electric field region between the AC electrode structure 13 and the grounded surface of the water at the interface and walls of the vessel 5. An AC power source 15 is connected to the AC electrode structure. The AC field region is identified as zone 2.

The AC electrode structure is spaced about 60 cm above the interface and may be constructed of flat steel or copper. The AC electrode is preferably a rectangular perforated steel or copper plate arranged horizontally above the interface. Obviously, other electrical conducting materials can also be used as the AC electrode.

A chamber 17 is located in the upper portion of the vessel 5 through which the process fluid flows exiting the vessel. Within chamber 17 an array of positive and negative DC electrodes 19 and 21, respectively, are mounted. The DC electrodes are composed of vertically mounted, rectangular flat plates arranged in a closely spaced parallel array with the electrodes alternately connected to the positive and negative terminals of a DC power source to produce a high gradient DC field in zone 3 of the dehydrator. Typically, the electrodes are spaced about 10 cm apart to produce a DC field strength of about 2500 V/cm therebetween to which the process flow in this area is exposed. The DC electrodes may also take the form of vertically disposed cylindrical rods alternately connected to the DC power source positive and negative sides to form the desired DC field gradient. In either case the objective of providing a high gradient DC field in zone 3 separated from the AC field in zone 2 of the dehydrator to remove small residual droplets of water from the process flow may be achieved. A high gradient DC field is beneficial when the drop size is very small and only a small drop population is present. The collisions of small drops are significantly increased as a result of electrical migration velocity of drops in the DC field. Thus, using separate AC and DC field regions allows an operator to separately adjust the field to properly tune the system for maximum phase separation. The phase separation phenomena are discussed individually hereinbelow.

After passing upward through zone 3 of the dehydrator, the treated oil exits from an outlet at the top of chamber 17. Water is pumped from the bottom of the vessel 5 at a rate which maintains the interface at a constant level.

Zone 1—Drop Interface Coalescence

The drop-interface coalescence occurs in zone 1. The ultimate phase separation can be achieved only when the drops coalesce at the liquid-liquid interface and the drop's content transfers into the bulk water phase. The capacity of the electrostatic coalescence unit depends on drop-interface coalescence and the liquid-liquid interfacial area available. In order to achieve the maximum drop-interface coalescence, the drop sizes at the interface must be maintained as close as possible to the initial drop size of the feed emulsion. Therefore, the emulsion inlet distributors are designed to be located in the dispersion band and as near as possible to the interface. The emulsion is distributed so a uniform emulsion layer covers an entire bulk liquid-liquid interface. No wedge-shape emulsion band is formed when the emulsion is evenly distributed over the interface.

Zone 2—Dipole Drop-Drop Coalescence

The phase separation mechanisms of zone 2 are dipole drop-drop coalescence and settling of coalesced drops into the dispersion band or the interface. The drops which are not coalesced at the interface, especially small drops, can be carried upward into zone 2 by an upward flow of the continuous phase. An AC electric field promotes drop-drop coalescence of these drops until they are sufficiently large to settle at the interface. Dipole drop-drop coalescence occurs in the zones between electrode-interface and electrode-vessel wall. The collisions of drops in zone 2 result from a large drop population and an upward flow velocity of the continuous phase. The coalescence efficiency of the AC electric field is large, therefore drop sizes in zone 2 are increased rapidly.

Electric field gradients of the AC electric field region may be adjusted. Generally, a low gradient AC electric field (100–1000 V/cm.) is required in zone 1 and zone 2. The primary phase separation of emulsion is accomplished in the AC electric field region. However, there may be a large number of micron-sized droplets in the original feed emulsion and/or generated during partial drop-interface coalescence because of secondary drop formation. These droplets coalesce with great difficulty and can be entrained with upward flow of the continuous phase. In order to accomplish a higher degree of phase separation, the separate high gradient DC electric field region (zone 3) provides the secondary phase separation.

Zone 3—DC Electric Field

A high gradient DC electric field is used in this zone. As pointed out above, the high electric field gradient of this zone is accomplished by closely spacing the electrodes. It should be emphasized that the drop sizes and drop population in zone 3 are very small compared with zone 1 and zone 2. The phase separation mechanisms of zone 3 are: collection of drops at the electrodes; drop-drop coalescence; settling of large coalesced drops; and increasing the drop velocity by electrode contact charging. When the distance between electrodes is small and a high DC electric field gradient is imposed, there is a rapid migration of drops to one of the electrodes. The water droplets in the oil continuous phase have a net positive charge and they will migrate to the negative electrode. The drop-drop coalescence of zone 3 is not effective for phase separation in this zone because the coalescence of two small droplets does not yield a drop sufficiently large to overcome the upward flow of the continuous phase and settle down into zone 2 and zone 1. In zone 3, only a small drop population and very small drop size are involved; the collisions between these droplets are very small and thus there is a very small drop-drop coalescence frequency.

Therefore, the primary separation mechanism in zone 3 is collection of drops at the electrodes. Drop-drop coalescence, settling of large coalesced drops, and drop contact charging are secondary phase separation mechanisms in this zone. Hydrophillicity treatments of the negative DC electrodes for improved collection is discussed hereinbelow.

Figure 3:
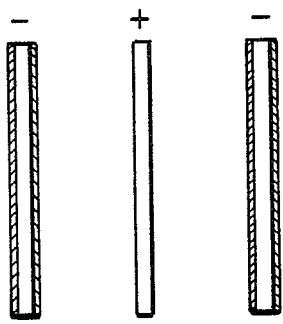
FIGS. 3 and 4 illustrate hydrophilic treatments of the negative electrodes of the DC electrode array shown in FIG. 1.
Figure 4:
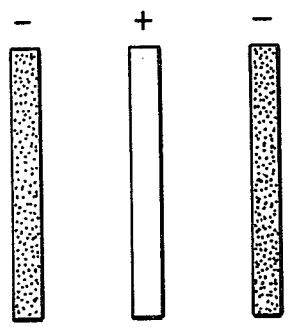

Since collection of drops at the electrode is a primary phase separation mechanism in zone 3, it is necessary to provide a large electrode surface area. The DC electric field region may be extended vertically to increase the surface area of the electrodes. Vertical extension provides longer droplet residence time. Although the large drops released from the DC electrodes may adhere onto the AC electrode, this phenomenon will not affect the drop-drop coalescence in zone 2 because the water is conductive and does not alter the electric field in zone 1 and zone 2. The wetting characteristics of a substrate are important factors determining the efficiency of drop adhesion onto the substrate. The important parameters which have to be considered are the three-phase contact angle through the water phase and the surface characteristics of the substrate such as smoothness. In order to achieve a drop collection efficiency of unity, the negative electrodes of the DC field region are made hydrophilic so that the three-phase contact angle approaches zero. The hydrophilic treatment of the negative electrodes can be accomplished in different ways, as follows:

1. Cover the negative electrode with a thin film of hydrophilic material such as a cellulosic material as illustrated in FIG. 3. Cellulose materials such as prewetted cotton fabric or cellulose acetate sheet may be used. Prewetting condition of the hydrophilic materials will assure hydrophillicity of the negative electrodes and thus enhance the collection of small water drops at the negative electrodes.
2. Form drop-electrode coalescence sites by using a porous negative electrode as illustrated in FIG. 4. The negative electrode is constructed from a metal, such as steel sheet plate, which has a sponge-like structure. The water drops collected at the electrode adhere to the electrodes by capillary force. A thin film of water will cover the entire electrode surface and act the same as the hydrophilic film in case 1.

Only the negative electrodes are hydrophillically treated. The untreated positive electrodes permit drops to acquire positive charges by drop contact charging. The positively charged drops are repelled from the positive electrodes toward the negative electrodes, and finally collected there. Since the distance between the positive and negative electrodes is small, only a short time is required to remove small drops from continuous oil by the drop collection mechanism.

Thus, it will be seen that an improved electrostatic coalescence system is provided which takes advantage of numerous phase separation mechanisms to provide more complete phase separation. Although the invention has been illustrated by means of a specific embodiment it will be obvious to those skilled in the art that various modifications and changes may be made therein without departing from the spirit and scope of the invention as set forth in the following claims.

What is claimed is:

1. In a system for coalescing water which is dispersed in an oil emulsion of a continuous oil phase process stream including a containment vessel into which said emulsion process stream is introduced, means for forming a body of the coalesced water droplets at the bottom of said vessel and maintaining the volume such that a constant level liquid-liquid interface is provided within said vessel and means for withdrawing the continuous oil phase process flow from which the water droplets have been removed at the top of said vessel, the improvement comprising:

means for introducing said oil emulsion in an evenly distributed layer over said interface;
   an AC electrode structure disposed within said vessel a predetermined distance above and parallel to said interface, said AC electrode structure having openings therethrough through which the continuous oil phase passes in an upward flow from its introduction adjacent said interface;

an AC power source connected to said AC electrode structure for producing an AC electrostatic field between said AC electrode structure and said interface sufficient to promote substantial coalescence of the water droplets in said emulsion to a size sufficient to gravitate to said interface;

a DC electrode structure array disposed within said vessel above said AC electrode structure for separately generating a DC electrostatic field through which said continuous oil phase passes after flowing through said AC electrode structure, said DC electrode array including an equal number of positive and negative electrodes in selected spaced-apart pairs extending parallel to the flow of said continuous oil phase; and a DC power source having its positive output terminal commonly connected to said positive electrodes of said DC electrode array and its negative output terminal commonly connected to said negative electrodes of said DC electrode array and providing a potential for producing a DC electrostatic field between adjacent pairs of said electrodes sufficient to promote coalescence and subsequent collection at the negative electrodes of droplets of water of insufficient size to be extracted by said AC field into droplets of water of sufficient size to gravitate to said interface.

2. The improved system of claim 1 wherein said DC electrodes are formed of electrically conductive plates arranged in vertical parallel extension with the flow of said continuous oil phase.

3. The improved system as set forth in claim 2 wherein the surface of said negative electrodes of said DC electrode array are hydrophilic.

4. The improved system of claim 3 wherein said negative electrodes are made of an electrically conductive metal coated with a celluosic material.

5. The improved system of claim 3 wherein said negative electrodes are constructed of a porous electrically conductive material.

6. The improved system as set forth in claim 1 wherein said AC electrode structure includes an electrically conductive perforated plate.

* * * * *